May 21, 1968     E. H. FROHBIETER     3,383,876
METHOD OF HARVESTING ICE BODIES AND APPARATUS THEREFOR
Filed May 31, 1966     2 Sheets-Sheet 1
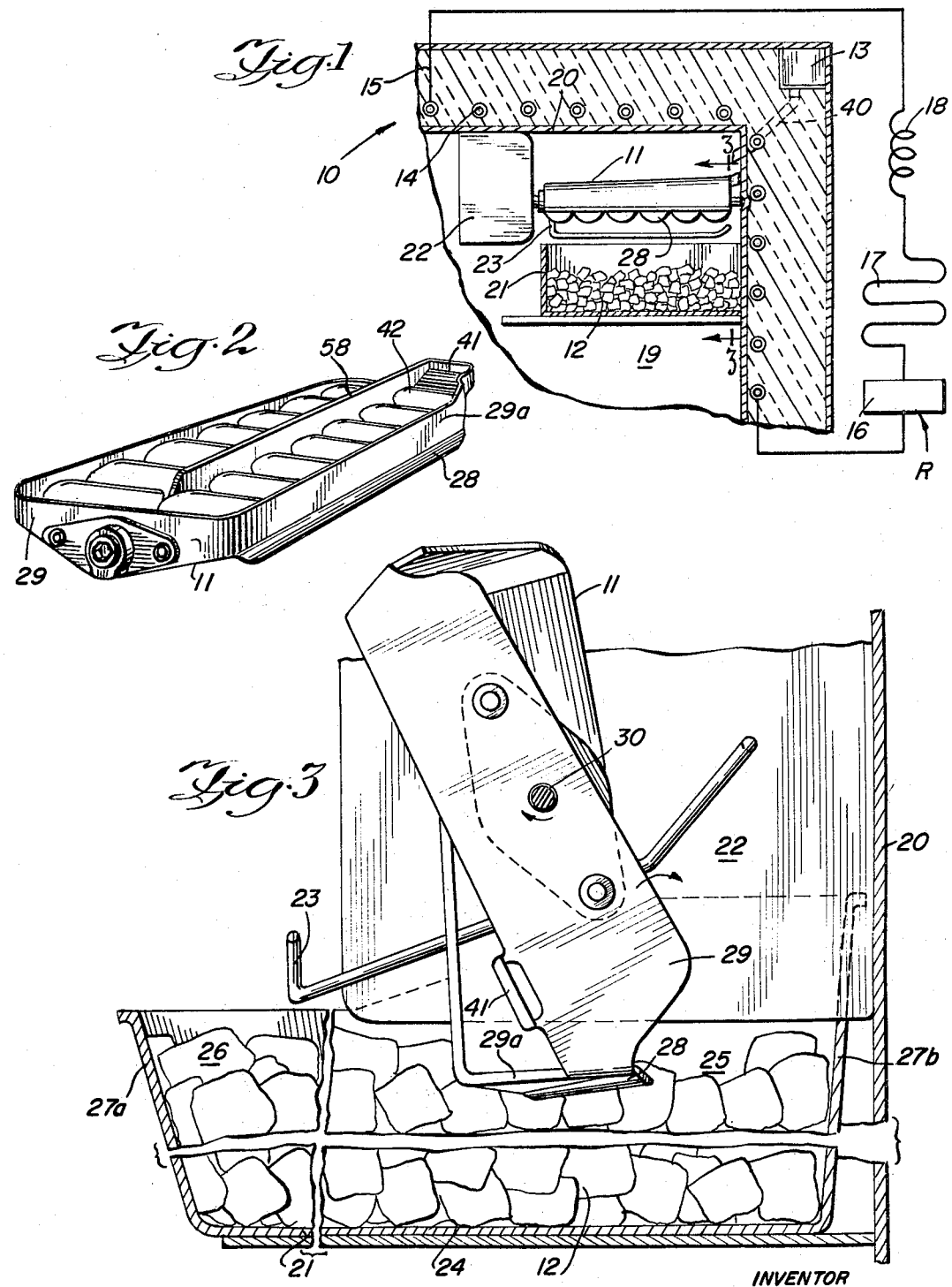
INVENTOR
Edwin H. Frohbieter
Hofgren, Wegner, Allen, Steelman & McCord
ATTORNEYS May 21, 1968   E. H. FROHBIETER   3,383,876
METHOD OF HARVESTING ICE BODIES AND APPARATUS THEREFOR
Filed May 31, 1966   2 Sheets-Sheet 2
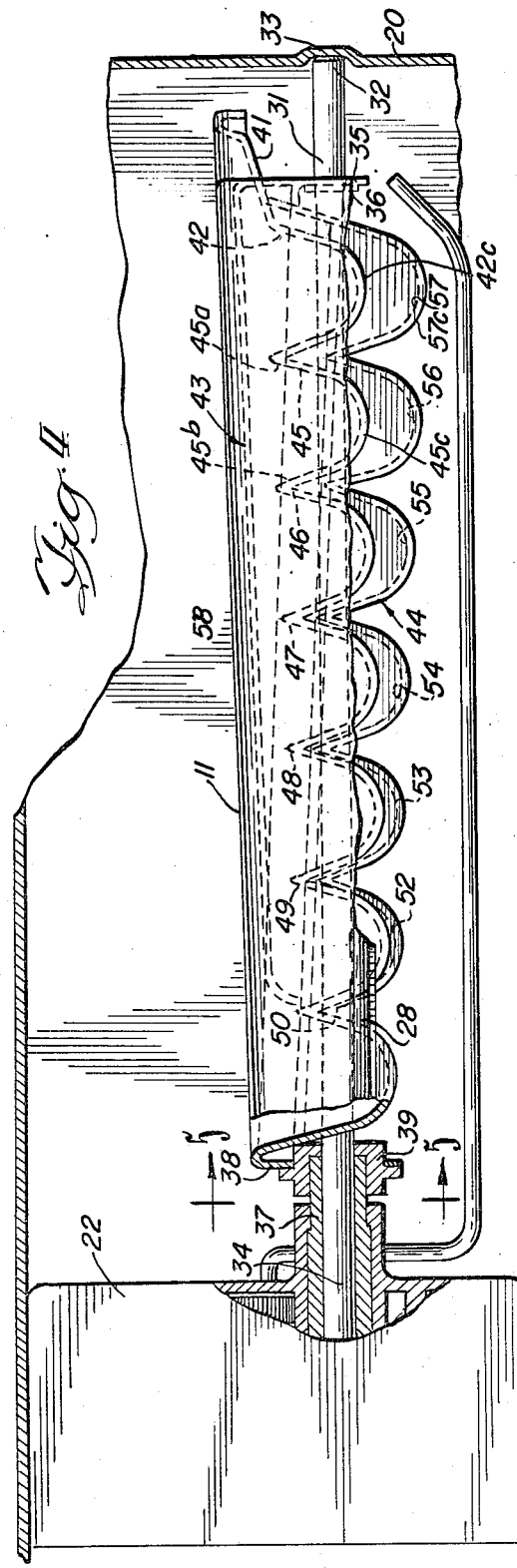
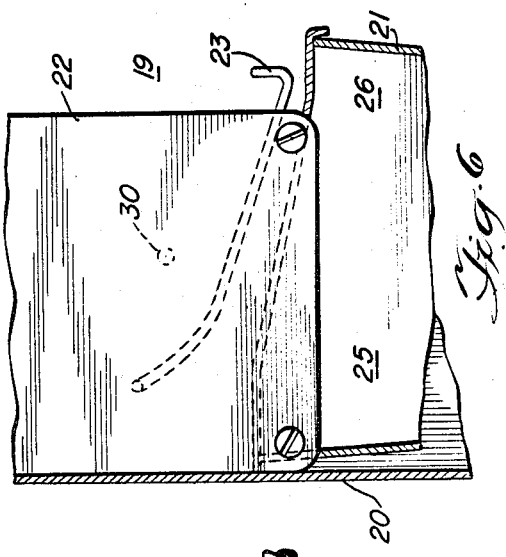
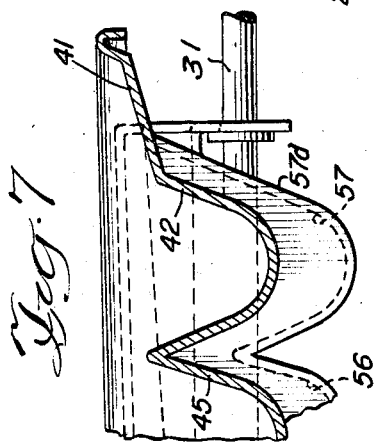
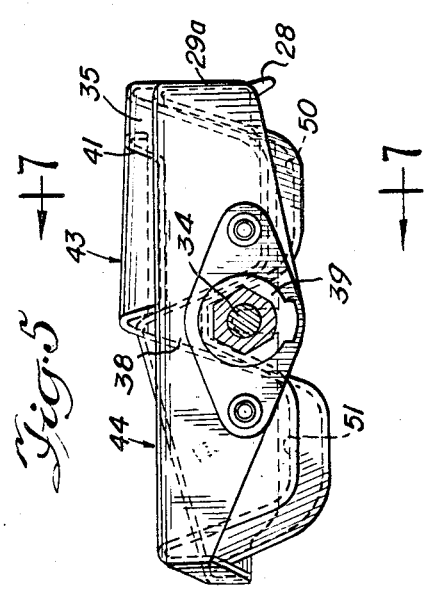

United States Patent Office 3,383,876
Patented May 21, 1968

3,383,876
METHOD OF HARVESTING ICE BODIES AND APPARATUS THEREFOR
Edwin H. Frohbieter, Stevensville, Mich., assignor to Whirlpool Corporation, a corporation of Delaware
Filed May 31, 1966, Ser. No. 554,102
12 Claims. (Cl. 62—72)

ABSTRACT OF THE DISCLOSURE

An icemaker apparatus having a mold in which ice bodies are formed. The ice bodies are ejected from the mold into a subjacent collecting bin by inversion of the mold. A rake is carried by the mold for leveling the ice bodies in the bin by transferring ice bodies piled in one portion of the bin to another portion thereof.

---

This invention relates to icemaker apparatus and in particular to a method and apparatus for harvesting ice bodies.

In one form of icemaker apparatus, ice bodies are formed in a mold which is subsequently inverted while being twisted so as to eject the ice bodies into a suitable subjacent collecting bin. An excellent example of such an icemaker apparatus is disclosed in my copending application for United States Letters Patent, Ser. No. 498,058, filed Oct. 19, 1965, entitled "Method for Harvesting Ice Bodies and Apparatus for the Same." The present invention comprehends an improved form of such an icemaker apparatus providing an improved harvesting of the ice bodies.

Thus, a principal feature of the present invention is the provision of a new and improved icemaker apparatus.

Another feature of the invention is the provision of an improved method of making, harvesting and storing ice bodies.

Still another feature of the invention is the provision of such an icemaker apparatus having new and improved means for harvesting ice bodies.

A further feature of the invention is the provision of such an icemaker apparatus having new and improved means for distributing the ice bodies in the collecting space, effectively precluding undesirable build up of the ice bodies in a portion of the space.

A yet further feature of the invention is the provision of such an icemaker apparatus having new and improved means for leveling the ice bodies.

Still another feature of the invention is the provision of such an icemaker apparatus including means defining a collecting space having a first portion and a second portion, one of said portions being accessible to a user, and means for transferring ice bodies from the first portion of the collecting space to the second portion to effect a more uniform distribution of the ice bodies in the collecting space.

A further feature of the invention is the provision of such an icemaker apparatus having new and improved means responsive to operation of the ejecting means to effect a substantially even distribution or leveling of the ice bodies in the collecting space.

Another feature of the invention is the provision of such an icemaker apparatus including a rotatable mold and means carried by the mold for effecting a leveling of ice bodies in the collecting space.

A further feature of the invention is the provision of such an icemaker apparatus wherein the leveling means is formed integral with the mold.

Still another feature of the invention is the provision of such an icemaker apparatus wherein the ice bodies are delivered to a first portion of the collecting space, the leveling means being arranged to transfer ice bodies from above a preselected level in the first portion of the collecting space to a second portion of the collecting space and wherein level sensing means are provided for sensing the level of the ice bodies in the second portion of the collecting space.

Another feature of the invention is the provision of such an icemaker apparatus wherein the leveling means is resiliently yieldable.

Yet another feature of the invention is the provision of a new and improved mold for forming ice bodies in an icemaker apparatus.

A further feature of the invention is the provision of such a mold comprising a twistable tray having a plurality of cavities arranged to be disposed in an unflexed filling arrangement seriatim at lower levels relative to a first filling cavity.

Other features and advantages of the invention will be apparent from the following description taken in connection with the accompanying drawings wherein:

FIGURE 1 is a fragmentary vertical section of an icemaker apparatus embodying the invention;

FIGURE 2 is a perspective view of the mold tray thereof;

FIGURE 3 is an enlarged fragmentary vertical section taken substantially along the line 3—3 of FIGURE 1;

FIGURE 4 is an enlarged fragmentary side elevation of the control and mold tray with portions broken away;

FIGURE 5 is a fragmentary vertical section taken substantially along the line 5—5 of FIGURE 4;

FIGURE 6 is a fragmentary front elevation of the icemaker apparatus with portions broken away; and FIGURE 7 is a fragmentary vertical section taken substantially along the line 7—7 of FIGURE 5.

In the exemplary embodiment of the invention as disclosed in the drawing, an icemaker apparatus generally designated 10 is shown to comprise an ice mold tray 11 for forming ice bodies 12 as a result of the freezing therein of water delivered to the tray from a suitable water supply 13. The water is frozen in tray 11 by suitable refrigeration means, herein illustratively comprising an evaporator 14 disposed within an insulated cabinet wall 15. The evaporator may be provided with suitable cooling refrigerant as by a conventional refrigeration means generally designated R including a compressor 16, a condenser 17 and suitable capillary means 18. Thus, the evaporator 14 may refrigerate the chamber 19 defined by the inner liner 20 of the cabinet wall 15 to a sub-freezing temperature to effect the desired freezing of the water in the tray 11 and maintain the resultant ice bodies 12 in a collecting bin 21 into which the ice bodies are delivered from the tray 11.

The forming of the ice bodies 12 and harvesting thereof by delivery to the collecting bin 21 is automatically controlled herein by a suitable control 22 which includes a sensing arm 23 for sensing the level of the ice bodies within the collecting bin 21 for automatiually terminating the forming of ice bodies when the level reaches a preselected level therein. As indicated briefly above, an excellent example of a control 22 suitable for use in controlling the operation of the icemaker 10 is disclosed in my copending application for United States Letters Patent, Ser. No. 498,058. Reference may be had to said application for a complete detailed disclosure of the structure of control 22. However, for purposes of understanding the present invention, briefly, control 22 is arranged to dispose the tray 11 in upwardly opening freezing position during which time water previously delivered to the tray is frozen therein to define a plurality of ice bodies 12.

Upon completion of the formation of the ice bodies, the control 22 causes a twisting and a rotation of the tray so as to free the ice bodies from the mold walls and as a result of the inversion of the tray eject, or dump, the freed ice bodies into the collecting bin 21. The sensing arm 23, however, is caused first to move into the collecting bin to sense the level of ice bodies therein and, in the event that the sensed level is above a preselected level, prevents the ejecting operation until such time as the level of ice bodies is lowered to below the preselected level, whereupon the ejecting operation is permitted to commence as described above. After the ice bodies are thus delivered into the collecting bin, the rotation of the mold is continued to an upwardly opening position in which the tray is refilled with water from the water supply means 13. Upon completion of the freezing of the ice bodies in the tray, the cycle is repeated as described above.

The present invention comprehends a number of structural features providing an improved ice making operation. More specifically, the invention comprehends the provision in icemaker 10 of new and improved means for leveling and distributing the ice bodies 12 in the space 24 within the collecting bin 21. As shown in FIGURE 3, the tray 11, which in the ejecting operation rotates from the horizontal position in a clockwise direction as seen therein, delivers the ice bodies into a first portion 25 of the space 24 at the right-hand side of the bin 21. As this portion of the collecting space is subjacent the tray and rearwardly of the control 22, it is relatively inaccessible to the user. The left-hand portion of the collecting bin is disposed leftwardly of the tray position and, thus, defines a second portion 26 of the space 24 which is relatively accessible for facilitated removal of ice bodies 12. For further improved accessibility, the side wall 27a defining the left-hand portion 26 of the space 24 is made to be substantially lower than the right-hand side wall 27b defining the first portion 25.

In the illustrated embodiment, the tray mold 11 may be formed of a suitable plastic and have a skirt portion or side wall 29 about its periphery. As shown in FIGURE 2, the tray 11 carries a rake 28 comprising a downwardly projecting resiliently flexible lower edge portion of the right side wall 29a of the mold. As the mold rotates in a clockwise direction from the fully inverted ejecting position back to the upwardly opening water fill position, the rake 28 sweeps through portion 25 of the collecting bin space 24, thereby raking ice bodies, from above the level in space 24 defined by the arcuate movement of the rake 28 about the pivot axis 30 of the ice tray, to the second portion 26 of the space 24. The resiliency of the rake 28 precludes undesirable jamming of the mechanism providing improved long life. If desired, the downwardly projecting rake edge portion 28 may be omitted and the lower edge of the right side wall 29a utilized to accomplish the raking action. However, the downwardly projecting rake as shown is preferred because it provides improved, more positive raking action.

It has been found that not only does the flexibility of the rake preclude stalling of the control and possible breakage of the mechanism, but further provides an improved raking action wherein the ice bodies are effectively raked to the space portion 26 with effectively minimum breakage. In addition to the flexibility of the rake 28 in precluding stalling of the control, a shaft 31 for rotatably carrying the tray may be journalled in a bushing 33 at the rear of compartment 20 in loose fitting relationship. This method of journalling permits movement of shaft 31 to provide additional movement of the tray if a severe obstacle is encountered by rake 28. Movement of the shaft at the control end of the icemaker is permitted by manufacturing tolerances.

As discussed above, the sensing of the level of ice bodies 12 in the collecting bin 21 is effected prior to the ejecting operation. More specifically, the sensing occurs within the first several degrees of rotation of the tray and thus indicates the quantity of ice bodies in the collecting bin prior to ejection of the quantity of ice bodies in the tray. As shown in FIGURE 3, the sensing arm 23 is disposed to move downwardly into portion 26 of space 24. Thus, the sensing arm is arranged to sense the level of the ice bodies in the portion of space 24 where from the ice bodies are normally removed by the user. In the event that the level of ice bodies in portion 26 of the space 24 is below the preselected level, the control 22 causes the ejecting cycle to continue whereby the ice-bodies in tray 11 are dumped therefrom into the portion 25 of space 24 and then subsequently effectively leveled by the rake 28 to transfer dumped ice bodies, from above the level of the bottom of the path of movement of the rake, to the portion 26. As discussed briefly above, in the event that the level of ice bodies in portion 26 sensed by the arm 23 is above the preselected level, the control prevents continuation of the ejecting cycle until such time as the level as reduced to below the preselected level, as by the user removing a quantity of ice bodies from the space portion 26. As shown in FIGURE 3, the sensing arm 23 is disposed above the collecting bin 21 during the ejecting and raking operation.

It will be evident from the above description that if desired, the structure may be modified such that ice bodies can be dumped into the accessible portion of the collecting bin 21 and thereafter raked toward the inaccessible portion of the bin. With this modified dumping arrangement the sensing arm would be located in such a manner so as to sense the level of ice bodies in the inaccessible portion of the collecting bin 21 or that portion into which the ice bodies are raked. Thus, with either structure, the sensing arm is preferably disposed in that portion of the bin into which the ice bodies are raked, to insure a substantially full bin of ice bodies under normal operating conditions.

Referring now to FIGURE 4, tray 11 is carried on shaft 31 having a rear end 32 rotatably journalled in a suitable bushing 33 in the liner 20. The forward end 34 of the shaft is rotated by the control 22. The shaft 31 is fixed to the rear wall 35 of the tray 11 by a suitable bracket 36. A sleeve 37 is connected to the front end 38 of the tray by a suitable connector 39, and is rotated by the control 22 at a different instantaneous rate relative to shaft 31, whereby the tray may be concurrently rotated about the axis of shaft 31 and twisted to effect the freeing and ejecting operation described above. The mechanism of control 22 providing the desired rotations of shaft 31 and sleeve 37 is described in detail in my above indicated copending application Ser. No. 498,058.

As indicated above, the water for forming the ice bodies 12 is provided from a supply 13. As shown in FIGURE 1, the supply 13 includes a conduit 40 extending into cabinet space 19 slightly above the rear end of the tray 11. As shown in FIGURE 2, the rear end of the tray 11 is provided with a deflector 41 which deflects the falling water into the rearmost right-hand cavity 42 of the tray. As shown in FIGURE 5, the right-hand portion 43 of the tray is disposed slightly higher than the left-hand portion 44 when the tray is in a horizontal arrangement. As shown in FIGURE 4, the right-hand portion 43 of the tray defines, in addition to cavity 42, a series of cavities 45, 46, 47, 48, 49 and 50. The left-hand portion 44 defines a series of cavities 51, 52, 53, 54, 55, 56 and 57. As shown, the cavities are generally horizontally related in a pair of side-by-side series with the first cavity 42 being at a first, uppermost level and the last cavity 57 being at a second, lowermost level with the cavities 45 through 56 being progressively lower than the uppermost cavity 42. As shown in FIGURE 5, cavities 50 and 51 may be at substantially the same level, if desired.

Each cavity of tray 11 includes an upstream, or first, wall portion, such as wall portion 45a defining cavity 45, and a downstream, or second, wall portion, such as wall portion 45b, defining cavity 45, the downstream wall portion being at a lower level than the upstream portion whereby water may flow from deflector 41 successively into each of the cavities commencing with cavity 42. Thus, after cavity 42 is filled, the overflow water flows into cavity 45 over wall 45a until reaching the level of downstream wall portion 45b, whereupon the water overflows from cavity 45 into cavity 46, this action being continued until the last cavity 57 is suitably filled. Each cavity 42 and 45 through 57 is provided with a bottom wall, such as bottom wall portion 45c, defining the bottom of cavity 45. The bottom walls, as shown in FIGURE 4, are at progressively lower levels starting with the bottom wall 42c of cavity 42 and ending with the lowermost bottom wall 57c of cavity 57. Thus, each of the cavities is effectively of substantially equal height, although at progressively lower levels; that is, the height of each cavity between the uppermost level of the downstream wall portion thereof and the level of the bottom wall portion thereof is substantially constant. The end wall 57d of the last cavity 57, as shown in FIGURE 4, extends to the top of the tray.

Thus, the downstream wall of each cavity, other than cavity 57, defines a weir controlling the depth of water in the cavity so as to provide a substantially identical ice body in each of the cavities. The provision of the progressively lower weirs in tray portion 43, the level thereof being lower progressively from the rear of the tray to the front, and the provision of the progressively lower weirs in tray portion 44, the level thereof being lower progressively from the front of the tray to the rear, provides an improved tray filling operation. Thus, if the apparatus 10 is installed out of level so that the front of the cabinet is above the level of the rear of the cabinet, water will flow progressively from the uppermost cavity 42 down to the lowermost cavity 50 of the tray portion 43 as long as the out of level condition does not raise the level of the lowermost cavity 50 above the level of the uppermost cavity 42. Such a raising of the front of the apparatus 10 will accentuate the difference in height of the cavities 51 through 57 of the left-hand portion 44 of the tray and, thus, will permit substantially normal successive overflow from uppermost cavity 51 to lowermost cavity 57 as described above.

Alternatively, where the apparatus 10 is out of level so that the front portion is lower than the rear portion, substantially no effect on the overflow from one cavity to the next is had on the flow from upper cavity 42 to lower cavity 50 of the right-hand tray portion 43, and progressive overflow will continue to result in each of the cavities of the left-hand portion 44 up to the point where the lowermost cavity 57 is above the level of the uppermost cavity 51. Thus, as long as the apparatus 10 is level or tilted fore and aft in either manner from the horizontal less than an amount wherein the upstream end of either side portion 43 or 44 of the tray 11 is below the downstream end thereof, substantially normal water fill functioning is obtained. As a result, the uniformity of the ice body size is effectively maintained in each of the cavities notwithstanding such fore and aft out of level conditions in the installation of the apparatus. Further, undesirable ice bridges between ice bodies resulting from water remaining above the weirs intermediate the respective cavities is effectively precluded, thereby improving the harvesting operation as discussed above by effectively assuring individual ejection of the ice bodies during the twisting and inversion of the tray 11.

Thus, tray 11 defines an improved mold construction providing for improved filling of the tray while assuring substantial uniformity in the ice bodies formed therein with effectively minimum bridging and with improved flexibility in the allowable fore and aft action of level installation of the apparatus.

While I have shown and described a preferred embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Icemaker apparatus comprising:
   means for forming an ice body including a mold;
   means for moving the mold from an ice body forming position to an ice body ejecting position;
   means defining an ice body collecting space having first and second horizontally related portions;
   means for ejecting the ice body from said mold into said first portion of said collecting space; and
   means movable with said mold for transferring to said second portion of said collecting space ice bodies above a preselected level in said first portion of said collecting space.

2. The icemaker apparatus of claim 1 including means for sensing the level of ice bodies in said second portion of the collecting space and preventing further forming of ice bodies by said forming means whenever said level in said second portion of the collecting space is above a preselected level.

3. The icemaker apparatus of claim 2 wherein said sensing means includes means for retracting the same to above said space during transferring of an ice body to said second portion of the collecting space.

4. The icemaker apparatus of claim 1 wherein said transferring means is operated as an incident of operation of said ejecting means.

5. The icemaker apparatus of claim 1 wherein the transferring means is moved by the ejecting means.

6. The icemaker apparatus of claim 1 wherein said ejecting means includes means for moving said mold above said first portion of said collecting space and said transferring means is translated by said mold to move through said first portion of the collecting space above said preselected level.

7. The icemaker apparatus of claim 6 wherein said transferring means comprises a rake carried by said mold.

8. The icemaker apparatus of claim 1 wherein the ejecting means comprises means for rotating the mold and said transferring means is operated as a function of rotation of said mold.

9. The icemaker apparatus of claim 8 including a shaft means mounting said mold for rotation, said shaft means being movable for precluding stalling of the apparatus on engagement thereof with an immovable object.

10. The icemaker apparatus of claim 1 wherein said transferring means is resiliently yieldable to effectively preclude stalling of the apparatus by engagement thereof with an immovable object.

11. The icemaker apparatus of claim 1 wherein said first portion of said collecting space is subjacent said mold and said second portion of said collecting space is accessible from a point adjacent said mold.

12. The method of making, harvesting, and storing ice bodies comprising the steps of:
   (a) freezing a quantity of water to form ice bodies;
   (b) dumping said ice bodies into a first portion of a storage receptacle;
   (c) moving a transferring member superjacent the desired upper level of the ice bodies to transfer any of said ice bodies extending above said level from said first portion of said storage receptacle to a second portion of said storage receptacle to distribute them substantially evenly in both said first and second portions of said storage receptacle;
   (d) sensing the level of ice bodies in said second portion of the storage receptacle; and
   (e) repeating steps (a) through (d) until the level of ice bodies in said second portion of said storage receptacle is above said desired upper level, and then terminating the harvesting of ice bodies.

References Cited

UNITED STATES PATENTS

| | | | |
|---|---|---|---|
| 3,163,018 | 12/1964 | Shaw | 62—353 X |
| 3,171,267 | 3/1965 | Mitchell | 62—352 |
| 3,187,516 | 6/1965 | Ludstrom | 62—352 X |
| 3,192,734 | 7/1965 | Swanson | 62—344 X |
| 3,266,265 | 8/1966 | Winkler | 62—344 |

ROBERT A. O'LEARY, *Primary Examiner.*

W. E. WAYNER, *Assistant Examiner.*